US010890219B2

(12) United States Patent
Innes

(10) Patent No.: US 10,890,219 B2
(45) Date of Patent: Jan. 12, 2021

(54) INTEGRATED FAN BRAKING MECHANISM

(71) Applicant: Oracle International Corporation, Redwood Shores, CA (US)

(72) Inventor: Eric Munro Innes, San Diego, CA (US)

(73) Assignee: Oracle International Corporation, Redwood Shores, CA (US)

( * ) Notice: Subject to any disclaimer, the term of this patent is extended or adjusted under 35 U.S.C. 154(b) by 273 days.

(21) Appl. No.: 15/712,550

(22) Filed: Sep. 22, 2017

(65) Prior Publication Data
US 2019/0093716 A1 Mar. 28, 2019

(51) Int. Cl.
| F16D 55/02 | (2006.01) |
| G06F 1/20 | (2006.01) |
| F04D 25/06 | (2006.01) |
| F04D 25/08 | (2006.01) |
| F16D 65/095 | (2006.01) |
| F04D 27/00 | (2006.01) |

(52) U.S. Cl.
CPC ............ *F16D 55/02* (2013.01); *F04D 25/06* (2013.01); *F04D 25/08* (2013.01); *F16D 65/095* (2013.01); *G06F 1/20* (2013.01); *F04D 27/008* (2013.01)

(58) Field of Classification Search
CPC ........ F16D 55/02; F16D 65/095; F04D 25/06; F04D 25/08; F04D 27/008; G06F 1/20
USPC ....................................................... 454/184
See application file for complete search history.

(56) References Cited

U.S. PATENT DOCUMENTS

| 3,575,527 A * | 4/1971 | Watanabe ............... F04D 25/08 416/32 |
| 4,443,155 A * | 4/1984 | Smith .................... F03D 7/0248 416/133 |
| 5,909,785 A * | 6/1999 | Uhlig ..................... F16D 65/092 188/206 R |
| 5,921,753 A * | 7/1999 | Ames ..................... F04D 27/008 416/169 R |
| 6,422,814 B1 | 7/2002 | Dickey et al. |
| 2005/0186071 A1 | 8/2005 | Franz et al. |

FOREIGN PATENT DOCUMENTS

DE 19844643 C1 1/2001

\* cited by examiner

*Primary Examiner* — Steven B McAllister
*Assistant Examiner* — Allen R Schult
(74) *Attorney, Agent, or Firm* — Invoke

(57) ABSTRACT

A fan system is disclosed that includes a braking mechanism for physically stopping rotation of a fan rotor. The braking mechanism is activated when the fan system is at least partially removed from a chassis or enclosure or when the chassis or enclosure including the fan system is opened. The fan rotor, of the fan system, may include a rotating blade assembly configured to rotate around an axis. A fan motor, of the fan system, is configured to cause rotation of the rotating blade assembly around the axis. The braking mechanism, of the fan system, is configured to apply friction to at least one component of the fan rotor when the braking mechanism is engaged. Application of friction to the at least one component of the fan rotor may stop rotation of the rotating blade assembly around the axis.

19 Claims, 4 Drawing Sheets

INTEGRATED FAN BRAKING MECHANISM

TECHNICAL FIELD

The present disclosure relates to braking mechanisms for fan systems. In particular, the present disclosure relates to an integrated fan braking mechanism.

BACKGROUND

Fan systems, e.g., for circulating air for cooling computer systems and electronic systems housed within chassis or enclosures, are typically user-replaceable modules. Typical fan systems include fan blades that rotate at relatively high rotations per minute (rpm) in order to produce a desired level of airflow. The rotating fan blades typically continue to rotate at considerable speed for some period of time even after being electrically disconnected, electrically deactivated, physically disconnected, or physically removed from an enclosure. This is because the fan systems operate at high rpm's. The blades may continue to rotate for several seconds up to several minutes. The rotating fan blades present a safety hazard when a user or service technician places their hands and fingers inside a chassis or an enclosure housing a fan system, as the rotating fan blades may cause injury upon accidental contact with the hands or fingers. Such an injury may occur during removal of the fan system from the housing, for example. In order to avoid such a hazard, some fan systems include a formed wire guard or the like to prevent physical contact between the fan blades and a foreign object, e.g., a hand or finger.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
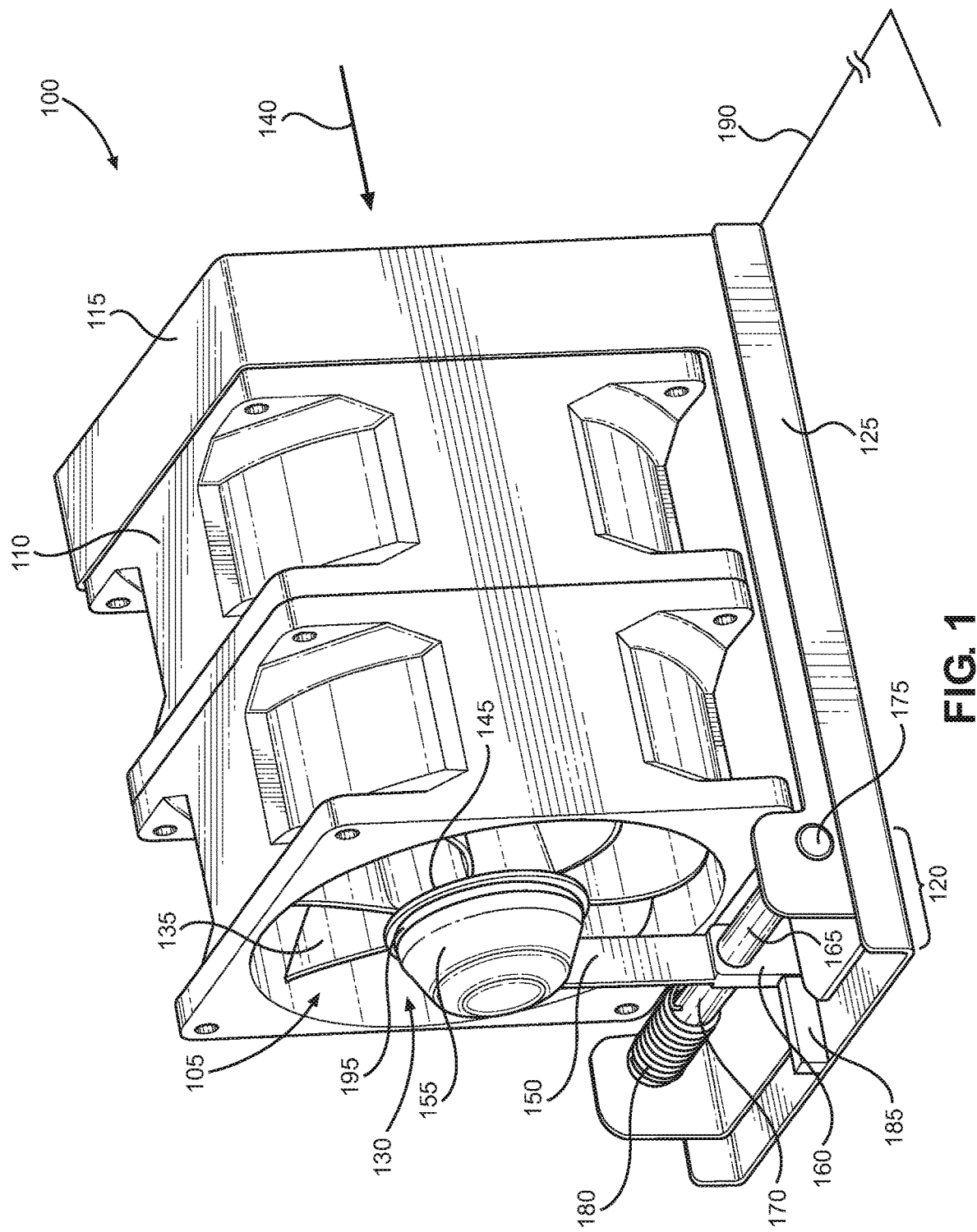
FIG. 1 is a perspective view that illustrates a fan system having a braking mechanism, in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. General Overview

In various embodiments, a fan system includes rotating fan blades and a braking mechanism that is operable to cause the rotating fan blades to stop rotating. The fan system may include, but is not limited to a fan rotor, a fan motor, and a braking mechanism. The fan rotor may include a rotating blade assembly configured to rotate around an axis. The fan motor may be configured to cause rotation of the rotating blade assembly around the axis. The braking mechanism may be configured to apply friction to at least one component of the fan rotor when the braking mechanism is engaged. The friction may be applied via a control arm having a braking portion that is configured to be disposed in a contact position against the one or more components of the fan rotor when the braking mechanism is engaged. Application of friction to the one or more components of the fan rotor may stop rotation of the rotating blade assembly around the axis. The one or more components of the fan rotor to which friction is applied by the braking mechanism may be part of the rotating blade assembly.

The braking mechanism may apply friction to a fan rotor that includes or is coupled with the rotating fan blades to stop rotation of the fan rotor, and thereby stop rotation of the fan blades. In some embodiments, the braking mechanism may be automatically activated when the fan system is removed from its operative position within a chassis or enclosure. The chassis or enclosure may be a standard component used for housing computer systems, electronics systems, or components thereof. The braking mechanism may be activated as a result of a user opening or removing a cover, door, or access panel for a chassis or enclosure that includes the fan system. The braking mechanism may be activated by a mechanical apparatus. The braking mechanism may be activated by electronic circuitry coupled with an actuator. The braking mechanism may be activated in response to activation of a switch, a button, or other physical input device operable by a user.

By applying friction to one or more components of the fan rotor, the braking mechanism may physically stop the rotation of the fan blades in a fan system in less than a second, or within a few seconds. Stopping the rotation of the fan blades by applying friction may stop the rotation of fan blades faster than fan systems which are configured to allow the fan blades to continue to rotate without any resistance after power to the fan rotor has been cut.

Fan systems with the braking mechanism, as described in various embodiments, may or may not include formed wire guards and the like. In at least one embodiment, the fan system with the braking mechanism does not include formed wire guards. The wire guards, which are designed to prevent injury caused by fingers coming into contact with rotating blades, may not be needed if the rotation of the blades is stopped prior to fingers being able to contact the blades. In at least one embodiment, the fan system with the braking mechanism does include formed wire guards. The formed wire guards may be used, for example, to hold the fan system, or protect the components of the fan system from being touched by fingers. The formed wire guards may also be used to prevent fingers from touching rotating blades when the blades are rotating without engagement of the braking mechanism. The formed wire guards may be removable components used temporarily during some tests.

One or more embodiments described in this Specification and/or recited in the claims may not be included in this General Overview section.

2. System Architecture

A detailed example is described below for purposes of clarity. Components and/or operations described below should be understood as one specific example which may not be applicable to certain embodiments. Accordingly, components and/or operations described below should not be construed as limiting the scope of any of the claims.

FIG. 1 is a perspective view that illustrates a fan system 100, in accordance with one or more embodiments. As illustrated in FIG. 1, the fan system 100 includes a fan rotor 105, a fan motor 110, a fan housing 115, a braking mechanism 120, and a chassis interface 125. In various embodiments, the chassis interface 125 may be disposed within a chassis or enclosure 190 that houses a computer system or electronics system. The chassis interface 125 may include power connections to provide electric power to the fan motor 110 when the fan housing 115 is fully inserted into the chassis interface 125, and disconnect electric power from the fan motor 110 when the fan housing 115 is at least partially removed from the chassis interface 125. The fan housing 115 may be disposed at an outside edge or wall of the chassis or enclosure 190 such that air may flow into the fan housing 115 from exterior to the chassis or enclosure 190 when the fan system 100 is operational. In one or more embodiments, the fan system 100 may include more or fewer components than the components illustrated in FIG. 1.

The fan rotor 105 may be mounted on a shaft rotationally driven around an axis by the fan motor 110. In some embodiments, the fan rotor 105 may be integrated with the shaft. In various embodiments, the fan rotor 105 may have a radius of between 1 and 2 inches, e.g., approximately 1.5 inches. The fan rotor 105 may include a rotating blade assembly 130 having a plurality of blades 135 surrounding the axis of the shaft, around which the rotating blade assembly 130 rotates. The blades 135 of the rotating blade assembly 130 may be angled to cause air to flow along the airflow direction 140 through the rotating blade assembly 130. Thus, the rotating blade assembly 130 may be operative to pull air from a region exterior to the fan housing 115 through the rotating blade assembly 130 when the fan motor 110 rotates the fan rotor 105 and rotating blade assembly 130 around the axis. In various embodiments, the fan rotor 105 may be formed as a single integrated part.

In various embodiments, the fan motor 110 may cause the fan rotor 105 to rotate under electric power. The fan motor 110 may cause the fan rotor 105 to rotate with a force of about 1.5 inch-pounds to 8 inch-pounds of torque. In various embodiments, the fan motor 110 may include a brushless electric motor.

The braking mechanism 120 may be configured to apply friction to at least one component of the fan rotor 105 when the braking mechanism 120 is engaged. This application of friction may be effective to stop rotation of the rotating blade assembly 130 around the axis of the shaft. The component of the fan rotor 105 to which the braking mechanism 120 may apply friction may include a component of the rotating blade assembly 130. In various embodiments, the rotating blade assembly 130 may include a generally flat circular region 145 disposed at an approximate center of the rotating blade assembly 130, e.g., close to and surrounding the axis while being disposed between the axis and the plurality of blades 135. The braking mechanism 120 may apply friction to the generally flat circular region 145 when the braking mechanism 120 is engaged. The generally flat circular region 145 may be configured to rotate concurrently with the rotating blade assembly 130.

The braking mechanism 120 may include a control arm 150, a braking portion 155 disposed at one end of the control arm 150, an actuating portion 160 on an opposite end of the control arm 150, and a base portion 165 disposed between the braking portion 155 and the actuating portion 160. In various embodiments, the base portion 165 may include a pivot rod 170 disposed perpendicular to the control arm 150 between the braking portion 155 and the actuating portion 160. The pivot rod 170 may pivotably couple the braking mechanism 120 with the fan housing 115 by being coupled with pivot points 170. In some embodiments, the pivot points 170 may include holes in the fan housing 115 through which the pivot rod 170 is inserted. The control arm 150 may pivot about the base portion 165 between a contact position in which the braking portion 155 applies friction to the fan rotor 105 to stop rotation of the fan rotor 105, and a non-contact position in which the braking portion 155 is physically separated from the fan rotor 105 to permit the fan rotor 105 to freely rotate.

The base portion 165 may include a biasing element, e.g., a spring 180, which may include a torsion spring, that biases the braking portion 155 of the control arm 150 toward the contact position. The spring 180 may engage the braking mechanism 120 when no external pressure is applied to the actuating portion 160. In various embodiments, the spring 180 may apply a biasing force of about 2 to 10 inch-pounds of torque. An amount of torque applied by the spring 180 may depend upon a number of factors, for example, a speed with which the fan rotor 105 rotates, a mass of the fan rotor 105, a radius of the fan rotor 105, the friction applied to the fan rotor 105 during engagement of the braking mechanism 120, and a length of the control arm 150 between the braking portion 155 and the base portion 165. While the spring 180 is shown as an example of the biasing element, this should not be construed as limiting, as other forms of the biasing element may be used in other embodiments. For example, the biasing element may include a rubber band or elastic member in some embodiments. The spring 180 may be coupled with the fan housing 115 and the pivot rod 170. In various embodiments, the biasing element may be integrated with the base portion 165. In various embodiments, the base portion 165 may be integrated with the control arm 150, the braking portion 155, and the actuating portion 160. In various embodiments, one or more of the components of the braking mechanism 120 may be formed of injection molded plastic, e.g., resin or polycarbonate, or may be formed of metal, e.g., metal casting or folded sheet metal. The material may be chosen according to its rigidity and resiliency to impact as well as its cost.

Characteristics of the spring 180 may be determined according to characteristics of the fan rotor 105. For example, an amount of pressure necessary to stop the fan rotor 105 from turning within a desired period of time after engaging of the braking mechanism 120 may at least in part determine a desired strength of the spring 180. In addition, a distance between the base portion 165 and the braking portion 155 along the control arm 150 and/or a distance between the base portion 165 and the actuating portion 160 along the control arm 150 may also at least in part determine a desired strength of the spring 180. The spring 180 may be formed of a metal, a plastic material, or other material that provides biasing characteristics.

The control arm 150 may be aerodynamically shaped to present low air resistance to the airflow 140 flowing through the rotating blade assembly 130. Key aerodynamic attributes of the control arm 150 may include an airfoil cross section of the control arm 150. An angle of attack with respect to the airflow 140 may be determined according to a velocity of the airflow 140. For example, in various embodiments, the angle of attack with respect to the airflow 140 may range between approximately 0 and 30 degrees, or between approximately 12 and 18 degrees. In an embodiment, the angle of attack may be approximately 15 degrees. In various embodiments, the shape of the control arm 150 may be tapered from a side closest to the fan rotor 105 and a side furthest from the fan rotor 105 along a path of the airflow 140. The shape of the control arm 150 may be configured as an airfoil to improve aerodynamic performance. A width of the control arm may be as narrow as possible while meeting material strength and mechanical stability requirements to minimize its obstruction to the airflow 140. In various embodiments, the control arm 150 may be less than about 10 mm or approximately 5 mm from the side facing the fan rotor 105 and the side facing away from the fan rotor 105, and a span of the control arm 150 from the braking portion 155 to the actuating portion 160 may be between 15 and 25 mm, or approximately 20 mm. The aerodynamic attributes of the control arm 150 may result in better airflow and acoustic performance compared to a traditional fan guard.

The braking portion 155 may include an aerodynamically shaped portion having a wider portion that is configured to be disposed against the generally flat circular region 145 of the rotating blade assembly 130 when the braking mechanism 120 is engaged. In some embodiments, the aerodynamically shaped portion may be in a shape of a cone or a partial cone with a generally flattened narrow end. The aerodynamic shape of the braking portion 155 may be configured to reduce drag on the airflow 140 that flows through the rotating blade assembly 130. Key aerodynamic attributes of the braking portion 155 may include a taper of the cone shape. A longer cone shape may result in better aerodynamic performance, but a length of the cone shape may be limited by a desired size of the fan system 100. The aerodynamic attributes of the braking portion 155 may result in better airflow and acoustic performance compared to a traditional fan guard.

In some embodiments, the braking portion 155 may include a brake pad 195 disposed between the braking portion 155 and the generally flat circular region 145 of the rotating blade assembly 130 to apply friction to the generally flat circular region 145 when the braking mechanism 120 is engaged. The brake pad 195 may include a high friction material, e.g., an elastomer or a rubber, which may be glued or over-molded onto the braking portion 155. By adjusting characteristics of the brake pad 195, an amount of friction applied to the generally flat circular region 145 may be adjusted. In some embodiments, the braking portion 155 may apply friction directly to the generally flat circular region 145 when the braking mechanism 120 is engaged without including the brake pad 195. In various embodiments, the brake pad 195 may apply a braking force of approximately 1 pound to 5 pounds. In some embodiments, any one or more of the braking mechanism 120, brake pad 195, and generally flat circular region 145 may include a texture to increase an amount of friction applied when the braking mechanism 120 is engaged. In some embodiments, the texture may include a series of bumps or peaks, e.g., having a height up to 1 mm. In some embodiments, the brake pad 195 may be disposed on the generally flat circular region 145 of the rotating blade assembly 130 instead of on the braking portion 155, and the brake pad 195 may be configured to rotate concurrently with the rotating blade assembly 130 around the axis when the fan system 100 is in an operational mode.

The actuating portion 160 may engage with an actuator 185 affixed to or disposed on the chassis interface 125 to engage the braking mechanism 120 when the actuator 185 presses the actuating portion 160 toward the fan rotor 105 or a plane of the fan rotor 105 and disengage the braking mechanism 120 when the actuator 185 releases pressure from the actuating portion 160 and thereby allows the actuating portion 160 to be moved away from the fan rotor 105 or a plane of the fan rotor 105 by the bias of the spring 180. In some embodiments, the braking mechanism 120 may be configured to disengage when an access panel, door, or cover of the chassis or enclosure 190 including the fan system 100 is closed, and engage when the access panel, door, or cover of the chassis or enclosure 190 including the fan system is at least partially opened.

In some embodiments, the actuator 185 may be fixedly attached to the chassis interface 125, e.g., as part of an end stop that stops movement of the fan housing 115 when the fan housing 115 is inserted into the chassis interface 125. The actuator 185 may include a fixed and non-movable element affixed to the chassis interface 125. The actuator 185 may provide continuous actuation force against the actuating portion 160 to maintain disengagement of the braking mechanism 120 when the fan housing 115 is installed within the chassis interface 125. In some embodiments, the braking mechanism 120 may be configured to disengage when the fan system 100 is installed within the chassis or enclosure 190 such that the fan rotor 105 may rotate freely, and engage when the fan system 100 is at least partially removed from the chassis or enclosure 190 to stop rotation of the fan rotor 105. When the fan housing 115 is installed in operational position within the chassis interface 125, the actuator 185 may press against the actuating portion 160 to disengage the braking mechanism 120 by causing the braking portion 155 to separate from the fan rotor 105 via a lever action of the control arm 150. When the fan housing 115 is removed from the operational position within the chassis interface 125, the actuator 185 may separate from the actuating portion 160 and permit the spring 180 to cause the pivot rod 170 to turn and the braking portion 155 to apply friction to the generally flat circular region 145 of the rotating blade assembly 130 and cause the fan rotor 105 to cease rotation. In this way, the fan system 100 may cease rotation of the fan rotor 105 promptly upon removal of the fan housing 115 from the chassis interface 125, and the fan system 100 may permit rotation of the fan rotor 105 promptly upon installation or re-installation of the fan housing within the chassis interface 125.

In some embodiments, which the braking mechanism 120 is engaged, motion of the control arm 150 may cause a rocker switch, contact switch, or the like to disconnect power from the fan motor 110, and when the braking mechanism 120 is disengaged, motion of the control arm 150 may cause the rocker switch, contact switch, or the like to connect power to the fan motor 110.

In some embodiments in which the spring 180 may not be present, the actuator 185 may actively control the motion of the actuating portion 160 toward or away from the fan rotor 105, e.g., by a motor or solenoid under control of an electronic control system. In some embodiments, the actuator 185 may be biased in a position away from the actuating portion 160, and when power is applied to a motor of the actuator 185, the actuator 185 may push the actuating portion 160 toward the fan rotor 105. For example, when a cover, door, or access panel of the chassis or enclosure 190 is opened, a sensor may trigger a control system to control the motor or solenoid of the actuator 185 to move away from the actuating portion 160 while power to the fan motor 110 is disconnected so that the braking mechanism 120 causes the fan rotor 105 to stop rotating. Then, when the cover, door, or access panel of the chassis or enclosure 190 is closed, the sensor may trigger a control system to power the motor or solenoid of the actuator 185 to move the actuator 185 toward the actuating portion 160 so that the braking mechanism 120 separates the braking portion 155 from the generally flat circular region 145 of the rotating blade assembly 130 while power to the fan motor 110 is restored. The sensor may include a contact switch.

Figure 2A:
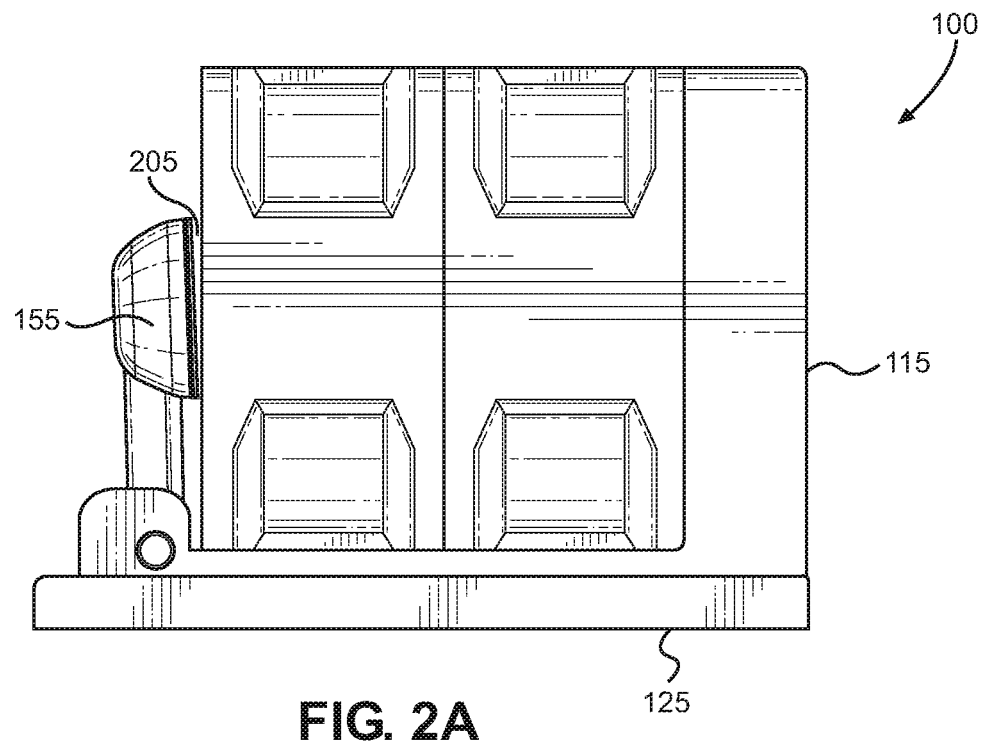
FIGS. 2A and 2B are a side views that illustrate the fan system of FIG. 1 in an installed position in which the braking mechanism is disengaged and a removed position in which the braking mechanism is engaged, respectively, in accordance with one or more embodiments.
Figure 2B:
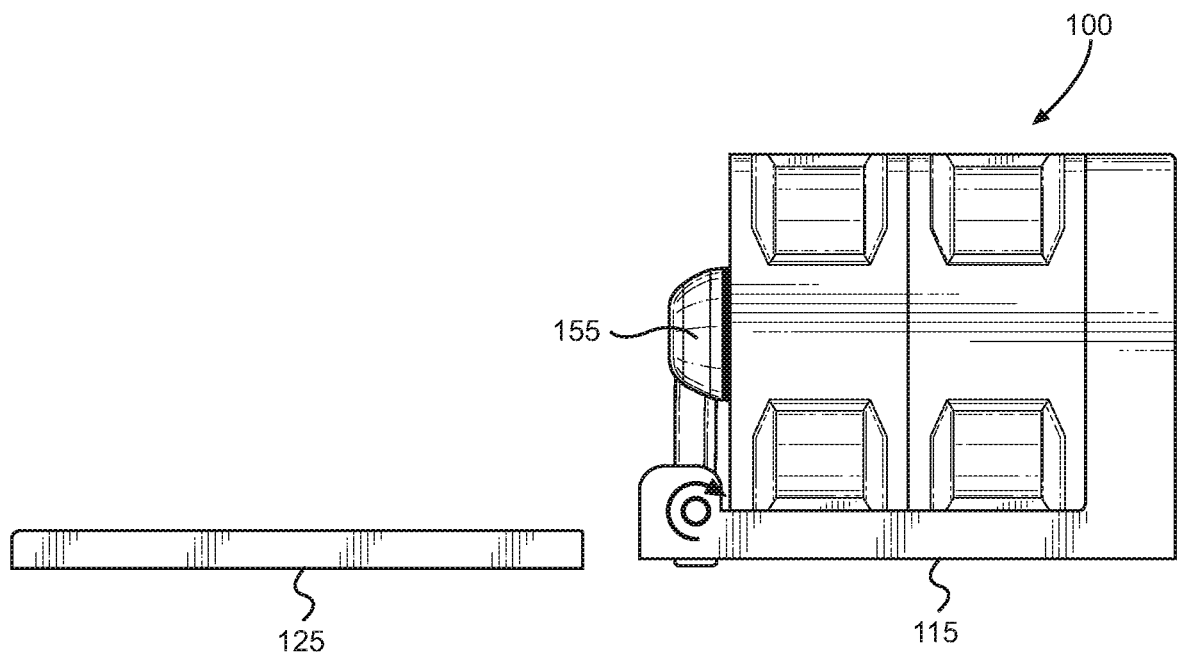

FIGS. 2A and 2B are a side views that illustrate the fan system 100 of FIG. 1 in an installed position in which the braking mechanism 120 is disengaged and a removed position in which the braking mechanism 120 is engaged, respectively, in accordance with one or more embodiments.

When the fan system 100 is installed in a chassis or enclosure 190 as illustrated in FIG. 2A, the braking portion 155 may be pivoted away from the fan rotor 105 by action of the actuator 185 pressing the actuating portion 160 of the braking mechanism 120 toward the fan rotor 105 or a plane of the fan rotor 105. As a result, a gap 205 may be present between the braking portion 155 and the fan rotor 105, thereby avoiding friction between the braking portion 155 and the rotating blade assembly 130. Thus, the braking portion 155 may be configured to be disposed in a non-contact position with relation to the generally flat circular region 145 of the rotating blade assembly 130 and the fan rotor 105 when the braking mechanism 120 is disengaged.

When the fan system 100 is removed from the chassis interface 125 as illustrated in FIG. 2B, or even moved away from the actuator 185, the braking portion 155 may be pivoted toward the fan rotor 105 by action of the spring 180. As a result, the braking portion 155 may apply friction to the generally flat circular region 145 of the rotating blade assembly 130 and cause the fan rotor 105 to quickly cease rotation and come to a stop. The braking portion 155 may pivot by a rotation of the pivot rod 170 about the pivot points 175.

While the illustrated design of the fan system 100 features a pivoting design for the braking mechanism 120, this should not be construed as limiting, as other manifestations of the design may be implemented according to the teachings herein. For example, in various embodiments, the braking mechanism 120 may be mounted entirely within the fan motor 110.

Figure 3:
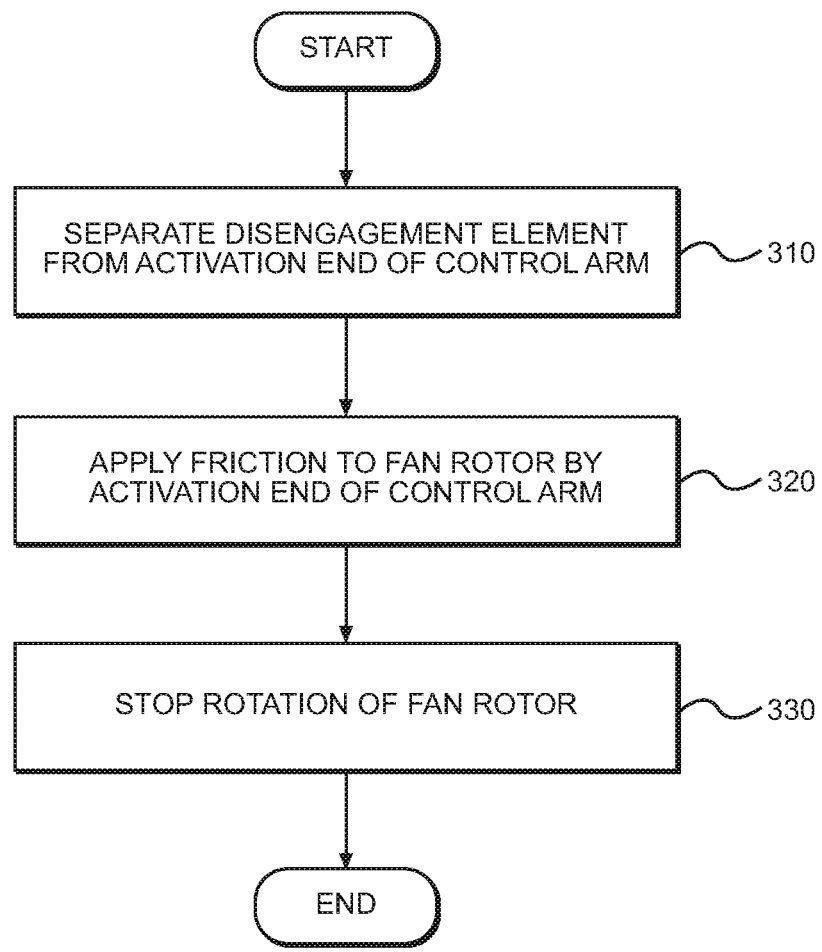
FIG. 3 is a block diagram that illustrates an example set of operations for engaging the braking mechanism of the fan system of FIG. 1, in accordance with one or more embodiments.

FIG. 3 is a block diagram that illustrates an example set of operations for engaging the braking mechanism 120 of the fan system 100 of FIG. 1, in accordance with one or more embodiments. One or more operations illustrated in FIG. 3 may be modified, rearranged, or omitted all together. Accordingly, the particular sequence of operations illustrated in FIG. 3 should not be construed as limiting the scope of one or more embodiments.

In an operation 310, a disengagement element may be separated from contact with an activation end of a control arm. The control arm may include the control arm 150. The disengagement element may include the actuator 185 illustrated in FIG. 1. The activation end of the control arm may include the actuating portion 160.

In some embodiments, the disengagement element may be separated from contact with the activation end of the control arm when the fan system, which may include the fan housing 115, is moved away from the actuator 185 and out of the chassis interface 125. For example, the disengagement element may be separated from contact with the activation end of the control arm in response to the fan system 100 being at least partially removed from a chassis, e.g., the chassis or enclosure 190.

In some embodiments, the disengagement element may be separated from contact with the activation end of the control arm when a motor of the actuator 185 is controlled to move the disengagement element away from the actuating portion 160, for example, when a sensor detects that a cover, door, or access panel of a chassis or enclosure 190 is opened. For example, the disengagement element may be separated from contact with the activation end of the control arm in response to the chassis or enclosure 190 that contains the fan system 100 being at least partially opened.

In an operation 320, in response to the separation of the disengagement element from contact with the activation end of the control arm in operation 310, friction may be applied to at least one component of the fan rotor by a braking mechanism via an engagement end of the control arm. The fan rotor may be an embodiment of the fan rotor 105. The braking mechanism may be an embodiment of the braking mechanism 120. The control arm may be an embodiment of the control arm 150. The engagement end of the control arm may be an embodiment of the braking portion 155.

In an operation 330, in response to the engagement end of the control arm applying friction to at least one component of the fan rotor in operation 320, rotation of the fan rotor and/or rotating blade assembly of the fan rotor around an axis may be stopped. The rotating blade assembly may include the rotating blade assembly 130. The speed with which the rotation may be stopped may be determined according to the level of friction applied by the engagement end of the control arm to the component of the fan rotor compared to the force applied to the fan rotor to cause it to rotate.

The braking mechanism 120 of the fan system 100 may be immediately actuated when the fan housing 115 is removed from the chassis or enclosure 190, and the rotation of the fan rotor 105 may be quickly stopped upon actuation of the braking mechanism 120. Because the rotation may be stopped quickly, there may be no safety hazard to a finger or hand during fan servicing, and therefore a traditional fan guard may be omitted from the fan system 100. Elimination of a traditional fan guard may result in measurable and significant performance and acoustic improvements compared to traditional fan systems that include a traditional fan guard. These improvements may facilitate smaller fan systems of equivalent performance to traditional fan systems, higher performance fan systems of an equivalent physical size as traditional fan systems, lower power consumption compared to traditional fan systems, and reduced acoustic noise compared to traditional fan systems.

3. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

4. Hardware Overview

According to one embodiment, the fan system 100 may be controlled by or used in conjunction with one or more special-purpose computing devices. The special-purpose computing devices may be hard-wired to perform the techniques disclosed herein, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 4:
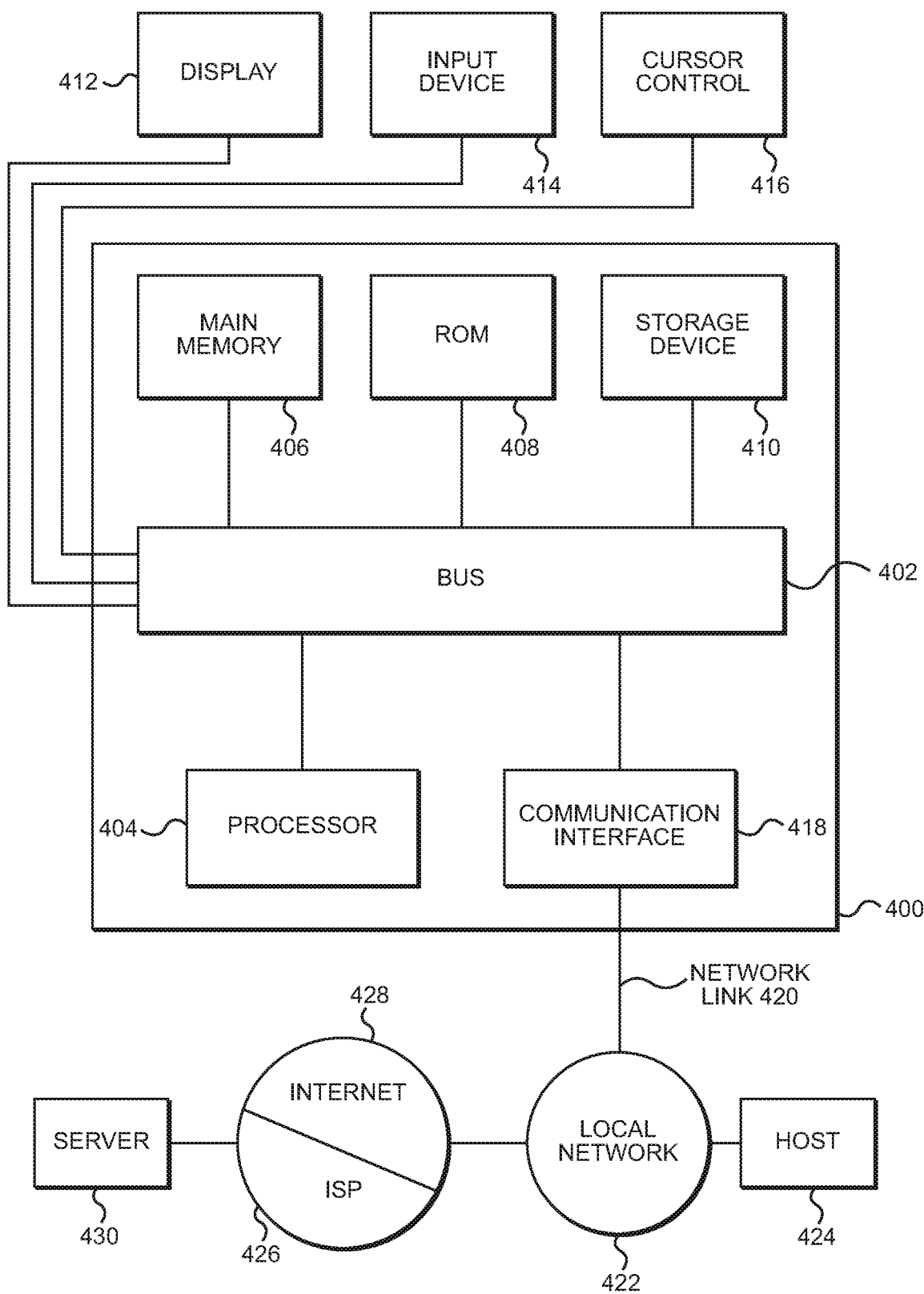
FIG. 4 is a block diagram that illustrates a computer system, in accordance with one or more embodiments.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A fan system comprising:
a rotating blade assembly comprising (a) a fan rotor and (b) rotating fan blades coupled to the fan rotor, the rotating blade assembly rotatable around a rotation axis, wherein the fan rotor is configured to rotate concurrently with the rotating fan blades, and wherein the fan rotor is disposed along a center of the rotating blade assembly;
a fan motor configured to cause rotation of the rotating blade assembly around the rotation axis;
a braking surface in releasable contact with at least a center of a flat region at an axial end of the fan rotor, the flat region being concentric with the rotation axis, and
wherein contact between the braking surface and at least the center of the flat region at the axial end of the fan rotor stops rotation of the rotating blade assembly around the rotation axis.

2. The fan system of claim 1, wherein the braking surface applies friction to the fan rotor via a control arm.

3. The fan system of claim 2, wherein the braking surface has a tapered cone shape comprising a first portion and a second portion opposite the first portion, wherein the first portion is between the second portion and the axial end of the rotating blade assembly and is wider than the second portion.

4. The fan system of claim 2, wherein the braking surface is configured to be disposed in a non-contact position with relation to the fan rotor when the braking surface is disengaged.

5. The fan system of claim 4, wherein upon engagement of the braking surface, the control arm is configured to pivot about a base portion comprising a spring that biases the control arm and the braking surface toward the flat region.

6. The fan system of claim 5, wherein the spring is a torsion spring.

7. The fan system of claim 1, wherein the braking surface is configured to:
(a) disengage when the fan system is installed within a chassis; and
(b) engage when the fan system is at least partially removed from the chassis.

8. The fan system of claim 1, wherein the braking surface is configured to:
(a) disengage when a chassis comprising the fan system is closed; and
(b) engage when the chassis comprising the fan system is at least partially opened.

9. The fan system of claim 1, wherein the braking surface comprises a brake pad.

10. A computing server system comprising:
a chassis;
electronic components that generate heat disposed within the chassis;
a fan system to cool an interior of the chassis, the fan system comprising:
a rotating blade assembly comprising (a) a fan rotor and (b) rotating fan blades coupled to the fan rotor, the rotating blade assembly rotatable around a rotation axis, wherein the fan rotor is configured to rotate concurrently with the rotating fan blades, and wherein the fan rotor is disposed at a center of the rotating blade assembly;
a fan motor configured to cause rotation of the rotating blade assembly around the rotation axis;
a braking surface in releasable contact with at least a center of a flat region at an axial end of the fan rotor, the flat region being concentric with the rotation axis; and
a torsion spring connected to the braking surface, the torsion spring indirectly urging the braking surface into contact with the axial end of the fan rotor;
wherein application of friction to the fan rotor stops rotation of the rotating blade assembly around the rotation axis; and
wherein the braking surface is configured to apply friction to at least the center of the flat region at the axial end of the fan rotor.

11. The computer server system of claim 10, wherein the braking surface comprises a brake pad.

12. A method of engaging a braking mechanism of a fan system having a rotating blade assembly comprising (a) a fan rotor and (b) rotating fan blades configured to rotate around a rotation axis, wherein the fan rotor is configured to rotate concurrently with the rotating fan blades, and wherein the fan rotor is disposed at a center of the rotating blade assembly, the method comprising:
- separating a disengagement element from contact with an activation end of a control arm;
- in response to the separating operation, applying friction, by a braking surface via an engagement end of the control arm, to at least a center of a flat region, the flat region at an axial end of the fan rotor and concentric with the rotation axis; and
- in response to the applying friction operation, stopping rotation of the rotating blade assembly around the rotation axis.

13. The method of claim 12, further comprising at least partially removing the fan system from a chassis, wherein the separating operation is in response to the removing operation.

14. The method of claim 12, further comprising at least partially opening a chassis comprising the fan system, wherein the separating operation is in response to the opening operation.

15. The fan system of claim 1, wherein the braking surface is configured to apply friction to the at least the center of the flat region at the axial end of the fan rotor when the braking surface is engaged, the braking surface not in contact with the rotating fan blades when not engaged.

16. The fan system of claim 1, wherein the flat region at the axial end of the fan rotor is a circular region.

17. The computer server system of claim 10, wherein the flat region at the axial end of the fan rotor is a circular region.

18. The computing server system of claim 10, further comprising:
- an actuator;
- an arm having a first end and a second end, the first end connected to the actuator, the arm transverse to the actuator; and
- a pivot rod transverse to both the actuator and the arm, the pivot rod connected to and disposed through the arm, wherein
- the torsion spring is disposed around the pivot rod and configured to apply torque to the pivot rod, thereby urging the braking surface into contact with the axial end of the fan rotor.

19. The method of claim 12, wherein the applying friction operation further comprises applying torque to a pivot arm connected to the activation end of the control arm opposite the engagement end of the control arm.

\* \* \* \* \*

UNITED STATES PATENT AND TRADEMARK OFFICE
CERTIFICATE OF CORRECTION

PATENT NO. : 10,890,219 B2
APPLICATION NO. : 15/712550
DATED : January 12, 2021
INVENTOR(S) : Innes Page 1 of 1

It is certified that error appears in the above-identified patent and that said Letters Patent is hereby corrected as shown below:

In the Claims

In Column 12, Line 61, in Claim 11, delete "computer" and insert -- computing --, therefor.

In Column 14, Line 5, in Claim 17, delete "computer" and insert -- computing --, therefor.

Signed and Sealed this
Twenty-second Day of June, 2021

Drew Hirshfeld
*Performing the Functions and Duties of the
Under Secretary of Commerce for Intellectual Property and
Director of the United States Patent and Trademark Office*